United States Patent [19]

Gupta

[11] 4,442,531

[45] Apr. 10, 1984

[54] METHOD AND APPARATUS FOR RECOGNIZING DIGITAL INFORMATION IN DIGITAL INFORMATION TRANSMISSION, PARTICULARLY IN MOBIL RADIO COMMUNICATIONS SYSTEMS

[75] Inventor: Probodh D. Gupta, Germering, Fed. Rep. of Germany

[73] Assignee: Siemens Aktiengesellschaft, Berlin & Munich, Fed. Rep. of Germany

[21] Appl. No.: 296,821

[22] Filed: Aug. 27, 1981

[30] Foreign Application Priority Data

Sep. 29, 1980 [DE] Fed. Rep. of Germany ....... 3036612

[51] Int. Cl.³ .............................................. H04L 1/22
[52] U.S. Cl. ........................................ 375/94; 371/36
[58] Field of Search ..................... 370/93; 340/825.62, 340/825.64; 371/31, 36, 67, 68, 69, 43, 44, 45; 375/94, 95

[56] References Cited

U.S. PATENT DOCUMENTS 3,526,837  9/1970  Zegers et al. .......................... 371/36
3,898,571  8/1975  Caprio ................................... 375/94

FOREIGN PATENT DOCUMENTS 1804719  5/1970  Fed. Rep. of Germany .

Primary Examiner—Benedict V. Safourek

Attorney, Agent, or Firm—Hill, Van Santen, Steadman & Simpson

[57] ABSTRACT

A method and apparatus are disclosed for recognizing digital information, particularly in an information transmission in mobile radio communications systems, in which a sampling pulse is derived from the received information at a whole multiple of the information clock frequency. A sampling pulse is placed into the respective area of an information element which has assumed its suspected, quasi-stationary state. A further, non-correlated sampling pulse is derived from the received information at a further whole multiple of the information clock frequency, the edges of which are placed at a corresponding number of sampling times within an extended sampling range of the pulse which represents the information element. Respective comparison of a first sampling result to one or more following sampling results is carried out for an information element and a majority decision is undertaken on the basis of the existing sampling results. All sampling modes are simultaneously effective and each information element gained is intermediately stored and respectively compared to each other information element during an intermediate storage phase. One of a plurality of information elements perceived as being error-free is relayed to an information sink at the end of the storage phase and the remaining stored information elements are erased.

5 Claims, 2 Drawing Figures

METHOD AND APPARATUS FOR RECOGNIZING DIGITAL INFORMATION IN DIGITAL INFORMATION TRANSMISSION, PARTICULARLY IN MOBIL RADIO COMMUNICATIONS SYSTEMS

CROSS REFERENCE TO RELATED APPLICATIONS

This application is related to my co-pending applications Ser. No. 296,972 and Ser. No. 296,867, both filed on Aug. 27, 1981.

BACKGROUND OF THE INVENTION

1. Field of the Invention

The present invention relates to a method and to an apparatus for recognizing digital information in a digital information transmission, particularly an information transmission in mobile radio communications systems.

2. Description of the Prior Art

Speech information, data information and image information are the forms of information which are to be transmitted in known, wire-bound communications systems and in a future mobile ratio communications systems. Given a transmission of information, particularly digitized information, in a mobile radio communications system, a problem arises in that, due to so-called multi-path propagation on the radio path, fading arises which can cause information bit errors during transmission.

Techniques are known by which a sampling pulse is derived at the respective receiver from the received digital information and is employed for placing a sampling time into the respective area of an information element in which the pulse to be sampled, and which represents the information element, assumes its suspected, quasi-stationary state, cf., for example, see the German allowed and published application Ser. No. 1,804,719. These known methods, however, have the disadvantage that, in those cases in which pulses representing information elements are distorted in amplitude and/or in phase due to disruptive influence, a bit error can be simulated precisely in the respective area sampled, although the appertaining pulse, when viewed as a whole, can be free of error.

In mobile communications systems previously designed, attempts are made to provide as favorable as possible a bit error rate by applying different encoding methods, for example, "forward error correcting". This philosophy, however, is opposed by the attempts to achieve a standardization of the operating modes.

SUMMARY OF THE INVENTION

The object of the present invention is to provide a method and an apparatus for recognizing digital information in a digital information transmission of the type mentioned above, by means of which favorable bit error rates can be achieved without having to accept one of the aforementioned disadvantages.

The above object is achieved, in systems of the type mentioned above, in which a sampling pulse from the digital information received at a receiver is preferably derived with a whole multiple of the information clock frequency and in which a sampling time is placed in the respective area of an information element in which the pulse to be sampled and representing this information element assumes a suspected, quasi-stationary state, and which is characterized in that at least one further, non-correlated sampling pulse is derived from the received digital information, the further sampling pulse exhibiting a further, whole multiple of the information clock frequency. The edges of the sampling pulse are placed at a corresponding number of sampling times within a further, extended sampling area of the pulse representing the information element. A respective comparison of a first sampling result with one or more following sampling results is carried out for an individual information element. A majority decision is made on the basis of the existing sampling results and all sampling modes provided are simultaneously effective. Each gained information element is intermediately stored and each information element is respectively compared to each other information element during an intermediate storage phase. At the end of the intermediate storage phase, one of a possible plurality of information elements perceived as being error-free is relayed toward a data sink and the remaining information elements are erased.

The present invention offers the advantage that a multiple sampling of the information elements can be executed in a simple manner and that pulses which are error-free overall per se, but which represent distorted information elements, can be accepted as error-free so that the information transmission experiences a higher utilization effect.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 2:
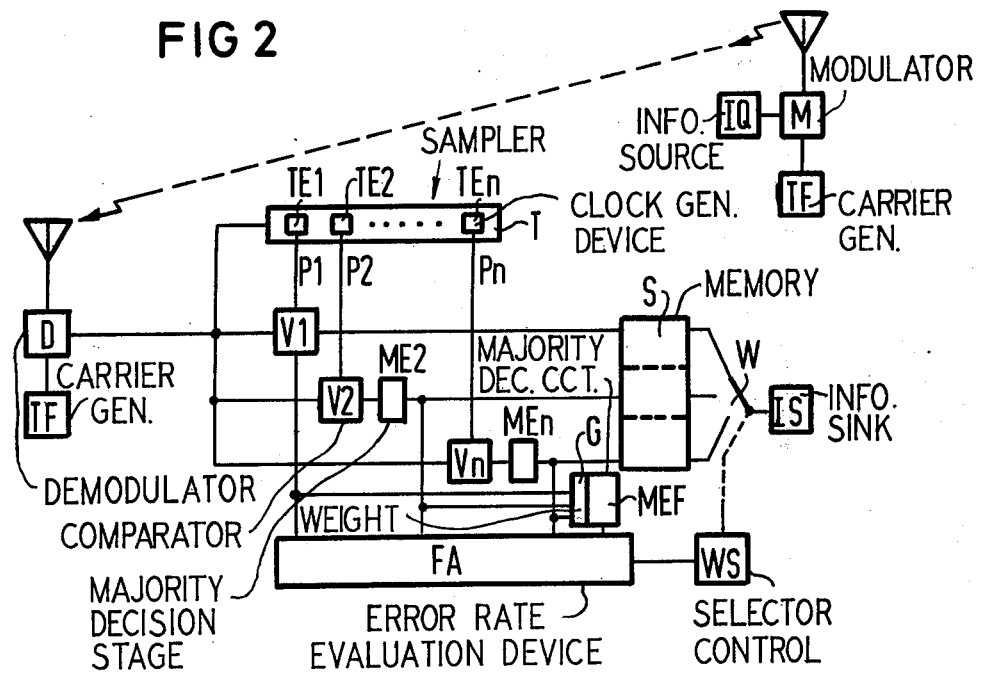
FIG. 2 is a block circuit diagram of a preferred exemplary embodiment of a circuit arrangement for implementing the method of the present invention.

Referring first to FIG. 2, a receiver is illustrated as comprising a demodulator D, a carrier frequency generator TF, a plurality of non-correlated clock generating devices TE1, TE2 . . . TEn in a sampling device T, a plurality of comparators V1, V2 . . . Vn, a plurality of majority decision stages ME2 . . . MEn, an error rate evaluation device FA, a majority decision circuit MEF for judging the mean error rate including an input weighting stage G, a selector W (shown as a rotary switch), a selector control WS, a memory S, and an information sink IS. The transmitter is also illustrated with devices which are known per se and which are only shown for an understanding of the interrelationships involved. The transmitter is thus shown as comprising an information source IQ, a carrier frequency generator TF and a modulator M.

Figure 1:
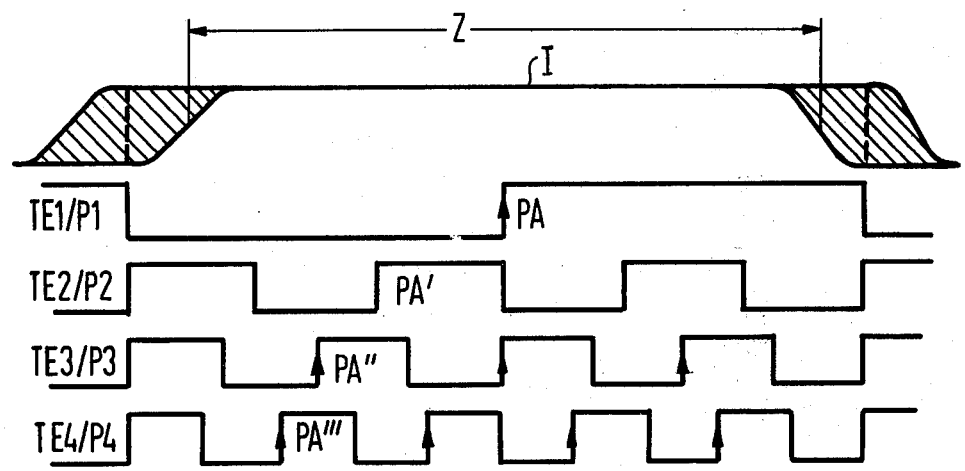
FIG. 1 is a timing diagram of an information pulse with various sampling pulses.

Referring now to FIG. 1, a pulse I, representing the information element to be sampled, can be sampled in sampling areas having various widths by the various sampling pulses P1, P2 . . . Pn. To this end, a comparison of a first sampling result to one or more following sampling results is respectively carried out for an individual information element within a time range Z. On the basis of a majority decision concerning the existing sampling results, that respective sampling mode is employed which exhibits the smallest-perceived information error rate.

To this end, individual comparators V1, V2 . . . Vn are respectively assigned and connected to the clock generating devices TE1, TE2 . . . TEn of the sampling device T. With the assistance of these comparators, the sampling results are derived from a single sampling or, respectively, from a respective multiple sampling of a single, individual information element. Individual majority decision stages ME2 . . . MEn are respectively connected to the comparators V2 . . . Vn, the majority decision stages selecting that sampling result as the "correct" sampling result in a manner known per se, for example, by means of so-called majority logic, which predominantly occurred in the multitude of the individual sampling results for a single information element. For that insrtance in which no majority occurs, the signal output of the appertaining majority decision stage is made high-resistant or, respectively, inactive for example, by means of a tristate logic device.

All such final sampling results identified from the first comparator V1 and the indivudual majority decision stages ME2 . . . MEn are supplied to a majority decision circuit MEF for evaluating the mean error rate which is preceded by a weighting stage G and to the error rate evaluation device FA. In the error rate evaluation device, the comparison results and a majority decision signal from the majority decision circuit MEF are processed or, respectively, edited in a known manner with one another. The selector control WS is connected to the signal output of the error rate evaluation device FA and receives a signal on the basis of which it is operable to set the selector W to the sampling mode, namely to the sampling pulse, for example to the pulse P2, which exhibits the smallest-perceived information bit error rate. The information sink IS of the information receiver is connected to the signal output of the selector W.

All sampling modes provided for the invention are simultaneously effective. Each information element obtained by sampling is intermediately stored in a memory S, which is designed as a flow memory--for example, with charge-coupled device (CCD) memories. At the end of the information storage phase, one of a possible plurality of information elements perceived as being error-free is tapped by the selector W which has been set for that purpose to the appertaining output of the memory S.

A method for recognizing digital information which makes the recognition of the digital information less sensitive to disruptions has been provided by the present invention including both the method and circuit arrangement suitable for implementation of the method, the arrangement of FIG. 2 representing a preferred exemplary embodiment.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for recognizing digital information of a digital information transmission, comprising the steps of:

first sampling, at a whole multiple of the information clock frequency, a pulse in a respective area of the pulse representing an information element in which the pulse assumes its suspected, quasi-stationary state;

then sampling the pulse of the information element at least one more time at a further multiple of the information clock frequency a corresponding number of sampling times within a further extended sampling range of the pulse representing the information element;

performing a majority decision with the sampling results to obtain respective information signals;

temporarily storing the information signals;

selecting one of the stored information signals as representing the information content of the sampled information element; and erasing the non-selected stored information signals.

2. The method of claim 1, and further comprising the steps of:

determining the mean error rate; and feeding out the stored information corresponding to the lowest mean error rate when no error-free information element has been perceived.

3. A circuit arrangement for recognizing digital information in a clocked carrier frequency modulated information transmission, comprising:

an antenna for receiving the information transmission;

a carrier frequency generator;

a demodulator connected to said carrier frequency generator and to said antenna for demodulating the received transmission;

a sampling device including a plurality of clock generating devices, said sampling device connected to said demodulator;

a plurality of evaluation circuits each connected to said demodulator and each connected to a respective clock generating device for evaluating the demodulated signal with respect to the sampling signal;

a plurality of majority decision stages each connected to a respective evaluation circuit with the exception of the first of the plurality of evaluation circuits for performing majority decisions with respect to the evaluation results;

an error rate evaluation device connected to said first of said plurality of evaluation circuits and to each of said majority decision devices for evaluating the mean error rate;

a mean error rate majority decision circuit connected to the first of said evaluation circuits, to each of said majority decision devices and to said error rate evaluation device, including a weighting stage for weighting the signals from said first evaluation circuit and said majority decision stages and providing a majority decision signal indicating the mean error rate to said error rate evaluation device;

an information sink;

a selector switch connected to said information sink and selectively connectible to the first of said evaluation circuits and to each of said majority decision devices;

a selector control device connected to said selector switch and operable to connect said information sink, via said selector switch, to the first evaluation circuit or majority decision stage which is providing the smallest perceived error rate in response to said error rate evaluation device; and storage means connected between said first evaluation circuit, said majority decision stages and said selector switch for intermediately storing the output signals for relaying the selected one of the same via said selector switch to said information sink.

4. The circuit arrangement of claim 3, wherein: said storage means comprises a plurality of flow memories.

5. The circuit arrangement of claim 4, wherein: said flow memories comprise charge-coupled devices.

* * * * *